United States Patent [19]

Bickle

[11] Patent Number: 4,812,367
[45] Date of Patent: Mar. 14, 1989

[54] MATERIAL FOR LOW-MAINTENANCE SLIDING SURFACE BEARINGS

[75] Inventor: Wolfgang Bickle, Reilingen, Fed. Rep. of Germany

[73] Assignee: Kolbenschmidt Aktiengesellschaft, Neckarsulm, Fed. Rep. of Germany

[21] Appl. No.: 909,997

[22] Filed: Sep. 22, 1986

[30] Foreign Application Priority Data

Sep. 25, 1985 [DE] Fed. Rep. of Germany ....... 3534133

[51] Int. Cl.⁴ .............................................. B32B 00/00
[52] U.S. Cl. ..................................... 428/332; 428/421; 252/12
[58] Field of Search .................. 252/12; 428/500, 421, 428/332

[56] References Cited

U.S. PATENT DOCUMENTS

| | | | |
|---|---|---|---|
| 4,255,462 | 3/1981 | Gebauer et al. | 428/421 |
| 4,394,275 | 7/1983 | Bickle et al. | 252/12 |
| 4,575,429 | 3/1986 | Jacobson | 252/12 |
| 4,626,365 | 12/1986 | Mori | 252/12 |
| 4,655,944 | 4/1987 | Mori | 252/12 |

*Primary Examiner*—Edith Buffalow
*Attorney, Agent, or Firm*—Sprung Horn Kramer & Woods

[57] ABSTRACT

A material for a low-maintenance sliding surface bearing comprises a metallic backing and on said backing a bearing layer comprising PVDF and an additive for improving the friction and sliding properties. To meet more stringent requirements regarding hygiene, the bearing layer is free of lead and contains 0.5 to 3% by weight of a non-toxic metal oxide power and 10 to 40% by weight of glass microspheres.

3 Claims, 3 Drawing Sheets

MATERIAL FOR LOW-MAINTENANCE SLIDING SURFACE BEARINGS

BACKGROUND OF THE INVENTION

This invention relates to a material for low-maintenance sliding surface bearings, which material comprises a metallic backing and a bearing layer having a thickness of 30 to 500 $\mu$m and consisting of a mixture of polyvinylidene fluoride(PVDF) and at least one additive for improving the friction and sliding properties.

European Patent Specification No. 44 577 discloses for use in low-maintenance sliding surface bearings a material consisting of a steel backing, a bronze layer and a bearing layer. A porous layer having a thickness of 250 to 350 $\mu$m has been sinter-bonded to the steel backing. The bearing layer has a thickness of 30 to 500 $\mu$m and consists of a mixture of 30 to 60% by weight PVDF and 20 to 50% by weight lead. The open pores of the bronze layer are also completely filled with said mixture. The mixture of PVDF and lead may optionally contain 5 to 30% by weight polytetrafluorethylene (PTFE). That material for sliding surface bearings exhibit in operation that mechanical-technological and physical behavior which is usually expected from similar materials for sliding surface bearings comprising a backing and a bearing layer, which is bonded to the backing and comprises a matrix consisting of fluorine-containing polymeric material and lead powder as an additive, but has the advantage that it can be machined when the bearing has been installed so that lubricating pockets and/or lubricating grooves can be formed in the bearing surface. Because the bearing layer can be machined when the bearing has been installed, it is possible to subject installed bushings to reaming or precision-turning, e.g., in order to compensate misalignments or to provide smaller bearing clearances.

In a grease-lubricated sliding surface bearing, such a material will suffer only an extremely small wear while the bearing is run in and, e.g., under a load of below 10 N/mm$^2$ and a high sliding velocity of up to 3 meters per second said wear amounts to about 0.0015 mm. Because the sliding surface bearings made of such a material require a relubrication only after relatively long intervals of time, they constitute low-maintenance bearings. But owing to the lead powder contained in the matrix of the bearing layer that material for sliding surface bearings cannot be used in certain technical fields in which hygiene is significant, for instance, in household appliances, packaging machines and medical-equipment and in machines for processing foodstuffs and for producing pharmaceutic materials.

SUMMARY OF THE INVENTION

For this reason it is an object to improve the material described first hereinbefore for low-maintenance sliding surface bearings so that the requirements regarding hygiene are fully met whereas the high load-carrying capacity of the material, its low coefficient of friction, low maintenance requirement, small wear, high ability to retain embedded dirt and extraneous substances, excellent physical properties and high stability of most chemicals should not be adversely affected and the bearing layer which is bonded to the metallic backing should not be detached under a dynamic load.

This object is accomplished in accordance with the invention in that in addition to PVDF the mixture contains 0.5 to 3.0% by weight of a non-toxic metal oxide powder having a particle size of about 0.05 $\mu$m and 10 to 40% by weight of solid glass spheres having a size of 1 to 50 $\mu$m.

The content of metal oxide powder preferably amounts to 1 to 2% by weight. Particularly suitable metal oxide powders include chromic oxide ($Cr_2O_3$) and ferric oxide ($Fe_2O_3$).

It has been found that the excellent technological, mechanical and physical properties of the material for sliding surface bearing will be preserved in spite of the omission of lead if the glass spheres are added, which are preferably coated with a conventional coupling agent, such as silane, in order to improve the interfacial adhesion, and that the bond between the metallic backing and the bearing layer fully meets the requirements. The wear resistance and the compressive strength as well as the inertness to chemical influences are distinctly improved by the addition of the glass spheres.

In a preferred embodiment of the material for sliding surface bearings, the mixture comprising the PVDF also contains 5 to 25% by weight polytetrafluoroethylene (PTFE) having a particle size $\leq 6$ $\mu$m in order to reduce the coefficient of friction.

In a particularly desirable embodiment, the metallic backing is provided with a rough primer, which preferably consists of a sintered or sprayed-on porous bronze layer having a thickness of 200 to 350 $\mu$m. The open pores of the bronze layer have a total volume of 24 to 45% and are completely filled by the mixture which consists of PVDF metal oxide powder and glass spheres and which also constitute the bearing layer.

DETAILED DESCRIPTION OF THE INVENTION

Figure 1:
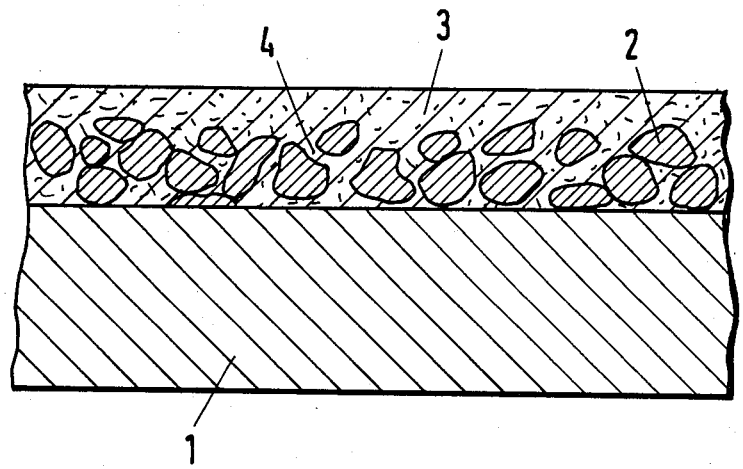
FIG. 1 is a sectional view of a material according to the invention.

A preferred material for low-maintenance sliding surface bearings is shown in FIG. 1 and consists of three layers, namely, a steel backing 1, a bronze layer 2 and a bearing layer 3 comprising a PVDF matrix. The porous bronze layer 2 having a thickness of 0.35 mm and consisting of a spherical tin-lead-bronze powder has been sinter-bonded on the steel backing 1. The bearing layer 3 consists of a mixture of PVDF, 12% by weight PTFE, 1.5% by weight chromic oxide and 22% by weight glass spheres. A rolling operation has been performed to fill the pores 4 of the bronze layer 2 with the mixture indicated hereinbefore and to form the bearing layer 3 at the same time.

Figure 2:
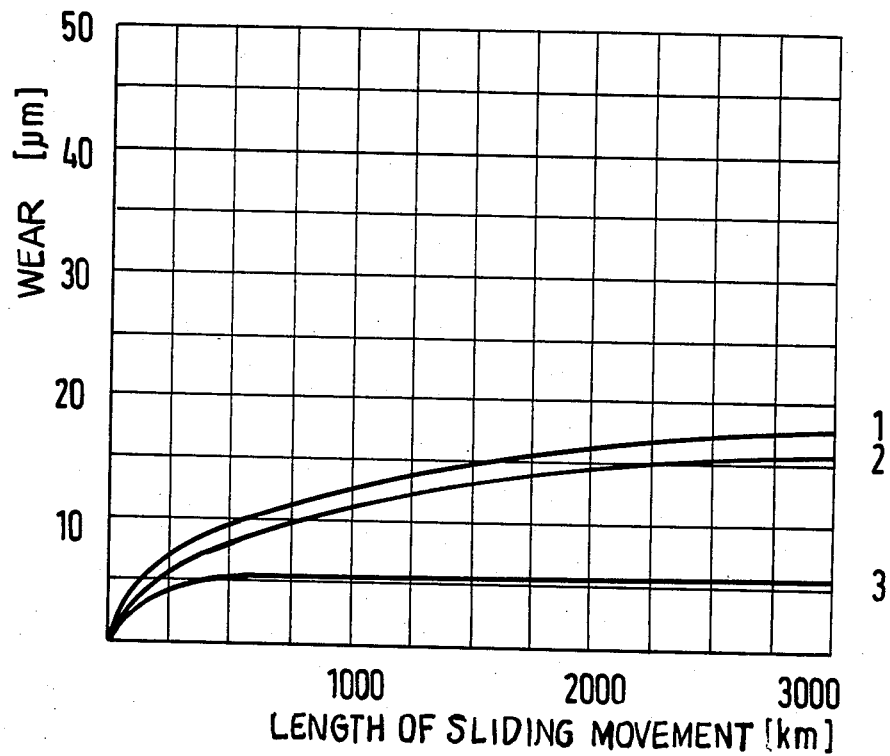
FIGS. 2 and 3 are graphs of wear behavior and load carrying capacity of the material of FIG. 1.
Figure 3:
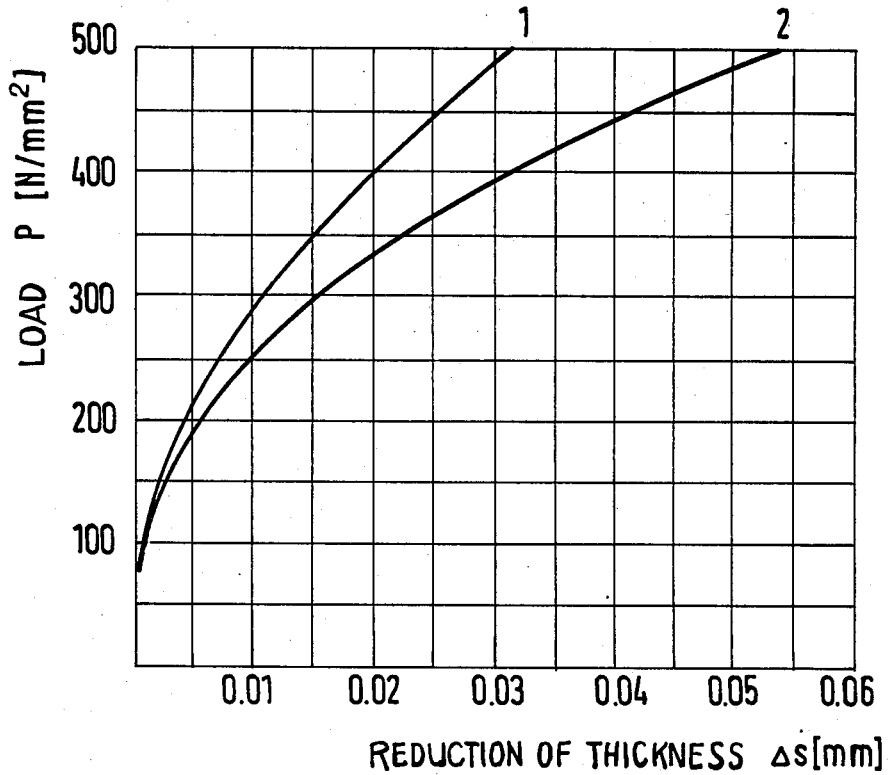

The graphs shown in FIGS. 2 and 3 illustrate the wear behavior and the static load-carrying capacity of an illustrative embodiment of the static load-carrying capacity of an illustrative embodiment of a material in accordance with the invention for sliding surface bearings and, for comparison, of shown materials for sliding surface bearings.

The graphs of FIG. 2 represent the dependence of the wear on the length of the sliding movement as a measure of the wear behavior under the stated conditions for a bearing bushing, which consists of a steel backing, a sinter-bonded steel backing, a porous bronze layer and a bearing layer consisting of polyoxymethylene POM (curve 1), for a bearing bushing in which the POM has been replaced by a mixture of 66% by weight PVDF, 22% by weight lead, and 22% by weight PTFE (curve 2), and for a bearing bushing made of the material in accordance with the invention for sliding surface bearings, in which the POM has been replaced by mixture of 64.5% by weight PVDF, 12% by weight PTFE, 1.5% by weight $Cr_2O_3$ and 22% by weight glass microspheres (curve 3). Upon a comparison it is apparent that the bearing bushing made of the material for sliding surface bearings in accordance with the invention exhibits a much smaller wear than the bearing bushings made of the known materials for sliding surface bearings.

To supplement the above FIG. 3 represents the results of an examination conducted to ascertain the static load-carrying capacity as the decrease of the thickness in dependence on load. The tests were conducted under the stated test conditions with circular test blanks made of the materials described hereinbefore for sliding surface bearings, in which the bearing layer consisted of PVDF-lead-PTFE (curve 1), or of PVDF-PTFE-$Cr_2O_3$-glass spheres (curve 2). It is seen that the material for sliding surface bearings in accordance with the invention has a higher static load-carrying capacity than the conventional material for sliding surface bearings.

What is claimed is:

1. A material for low-maintenance sliding surface bearings, which material comprises a metallic backing and a bearing layer having a thickness of 30 to 500 μm and consisting of a mixture of polyvinylidene fluoride (PVDF) and at least one additive for improving the friction and sliding properties, wherein the mixture further contains 1 to 2% by weight of a non-toxic metal oxide powder consisting of one of chromic oxide and ferrix ocide having a particle size of about 0.05 μm, 10 to 40% by weight of solid glass spheres having a size of 1 to 50 μm and coated with a coupling agent comprising silane and 5 to 25% by weight polytetrafluoroethylene (PTFE) having a particle size of 6 μm and wherein the bearing layer is provided on a rough primer, on the backing and wherein the rough primer consists of one of a sintered and sprayed-on porous bronze layer having a thickness of 200 to 350 μm and the open pores of the bronze layer have a total volume of 24 to 45% and are completely filled by the mixture which consists of PVDF, metal oxide powder and glass spheres and which also constitute the bearing layer.

2. The low-maintenance sliding surface bearing made of a material according to claim 1.

3. The low-maintenance bearing bushing made of a material according to claim 1.

* * * * *